United States Patent
Frauhammer et al.

(10) Patent No.: US 6,971,651 B2
(45) Date of Patent: Dec. 6, 2005

(54) DEVICE FOR SEALING A SPACE

(75) Inventors: Karl Frauhammer, Leinfelden-Echterdingen (DE); Heinz Scherring, Dettenhausen (DE); Joerg Friedrich, Filderstadt (DE); Andreas Strasser, Rudersberg (DE); Karsten Blair, Friedrichshafen/Bodensee (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 10/181,578

(22) PCT Filed: Jan. 9, 2001

(86) PCT No.: PCT/DE01/00047

§ 371 (c)(1),
(2), (4) Date: Jul. 18, 2002

(87) PCT Pub. No.: WO01/55623

PCT Pub. Date: Aug. 2, 2001

(65) Prior Publication Data

US 2003/0011134 A1 Jan. 16, 2003

(30) Foreign Application Priority Data

Jan. 28, 2000 (DE) .......................................... 100 03 772

(51) Int. Cl.⁷ ............................................... F16J 15/32
(52) U.S. Cl. ...................... 277/549; 277/569; 277/563; 279/75
(58) Field of Search .......................... 279/19.4, 75, 905; 277/549, 569, 563, 579, 585

(56) References Cited

U.S. PATENT DOCUMENTS

| 4,582,170 A | 4/1986 | Horiuchi |
| 5,110,143 A | 5/1992 | Hibbetts |
| 5,996,707 A * | 12/1999 | Thome et al. ................. 173/2 |
| 6,145,842 A * | 11/2000 | Zellers et al. ............... 277/394 |

FOREIGN PATENT DOCUMENTS

| DE | 403 26 946 A1 * | 2/1992 | ................ 279/19.4 |
| DE | 100 01 192 A1 * | 7/2001 | ................ 279/19.4 |
| EP | 0 473 908 A | 3/1992 | |
| GB | 1 136 632 A | 12/1968 | |

OTHER PUBLICATIONS

Patent Abstracts of Japan vol. 017, No. 083 (M–1369), Feb. 1993 & JP 04 282058 A, Oct. 7, 1992.
Patent Abstracts of Japan vol. 009, No. 303 (M–434), Nov. 30, 1985 & JP 60 139970 A, Jul. 24, 1985.

* cited by examiner

*Primary Examiner*—Enoch Peavey
(74) *Attorney, Agent, or Firm*—Michael J. Striker

(57) ABSTRACT

In a multi-chamber device a chamber with lubricant is sealed off on a rotationally drivable component from a second chamber at a peg of a power tool, by at least one seal sliding at a contact face, and least one stationary component is provided in the chamber with lubricant before the contact face and surrounds a rotationally drivable component at least over a region of a circumference to substantially prevent turbulence in the lubricant in a region of the contact face.

13 Claims, 3 Drawing Sheets

DEVICE FOR SEALING A SPACE

BACKGROUND OF THE INVENTION

The invention is based on a device for sealing off a chamber.

In mechanical gears, rotating pegs that protrude through a housing wall surrounding the gear have to be sealed off, as in the case of an oil-filled gear housing of a power tool, to avoid a loss of oil. For that purpose, one skilled in the art uses ring seals that surround the peg. The housing is sealed off from the outside via lip of the seal that slides along a running face of the peg. To achieve a permanent sealing action, the sealing lip is as a rule lubricated by the oil in the housing at the contact face, for instance with the oil level being higher than where the seal is disposed in the housing.

SUMMARY OF THE INVENTION

The invention is based on a device for sealing off a chamber with lubricant on a rotationally drivable component from a second chamber, in particular at a peg of a power tool, having at least one seal sliding at a contact face.

It is proposed that in the chamber filled with lubricant, before the contact face, there is at least one stationary component, which surrounds the rotationally drivable component at least over one region of its circumference and at least largely prevents turbulence in the lubricant in the region of the contact face. Because the stationary component acts as a flow brake and turbulence is avoided, the lubricant film at the contact face between a sealing lip of the seal and the rotationally drivable component, especially at high rpm of the rotationally drivable component, can be prevented from tearing and from drying out. Good lubrication and secure sealing along with a long service life can be achieved, for instance in the case of an armature shaft of a power tool.

It is also proposed that before the contact face, at least one formed-on rib is disposed on a housing part. With the rib formed onto the housing part turbulence in the lubricant in the region of the seal can be reduced or largely avoided in a structurally simple, economical way without additional components. One or more ribs can partly or completely surround the rotationally drivable component. The rib can also include additional mechanical functions, for instance the fixation of further components.

Especially advantageously, however, turbulence in the lubricant in the region of the seal can be reduced or prevented by providing that before the contact face, a sleeve surrounding the rotationally drivable component is disposed.

In a further feature, it is also proposed that the sleeve is secured to the rib. As a result, the sleeve can be fixed in its position in a structurally simple, economical way, and the sleeve can be retained by one or more ribs. The sleeve can be embodied integrally with one or more ribs, or it can be secured to one or more ribs via a nonpositive, positive, and/or material connection.

Advantageously, the sleeve has a length of at least 2 mm in the axial direction. The longer the sleeve, the better turbulence in the lubricant in the region of the seal can be avoided. Moreover, the sleeve advantageously has a small axial spacing from the contact face of the seal and a small radial spacing from the rotationally drivable component, specifically advantageously less than 1 mm.

It is also proposed that between at least two ribs, at least one recess is made. Through the recess, an exchange of lubricant and as a result a long service life of the lubricant can advantageously be attained. In principle, however, a subdivision into two lubricant-filled chambers is conceivable, specifically into one chamber that is defined by the sleeve, the rib, the housing, the seal, and the rotationally drivable component, and a further chamber, in which a gear is for instance disposed.

Rotating sets of teeth can cause major turbulence and flows in the lubricant. If the stationary component surrounds a set of teeth, then the turbulence in the lubricant in the region of the seal can be effectively reduced or prevented.

In a further feature, it is proposed that in the second chamber before the seal, a feed screw operatively connected to the rotationally drivable component is disposed, which at least largely over one region of its circumference is surrounded by a second stationary component. The lubricant escaping through a small leak in the seal can be returned to the seal again. The lubricating action of the seal can thus be additionally improved, along with the provisions proposed above with which the development of turbulence in the lubricant in the region of the seal can at least largely be reduced. The sealing lip can especially advantageously be lubricated on both sides, and a long service life can be attained, especially in the case of a power tool armature shaft rotating at high speed.

To economize on the number of components, the feed screw can be placed in the rotationally drivable component. Especially economically, however, the feed screw can also be placed in a separate sleeve, which is joined to the rotationally drivable component. The sleeve with the feed screw can furthermore be integral with a race for the seal, so that additional components and assembly expense can be avoided.

So that slight quantities of lubricant that may have escaped from the first chamber can be stored in the second chamber, and so that a continuous supply of lubricant from the second chamber to the sealing lip of the seal can be assured, it is proposed that a felt ring is disposed axially between the contact face and the feed screw. Along with a storing action of the felt ring, an additional sealing action can be achieved by the disposition of the felt ring.

The felt ring can be embodied as a sliding seal. However, in order advantageously to be able to return escaped lubricant to the seal, the felt ring has a gap from an adjacent component, across which gap the lubricant can be fed to the seal by the feed screw. Friction and wear between the felt ring and the adjacent component can be avoided. Advantageously, the felt ring is retained in a sleeve surrounding the feed screw. This saves additional components, assembly effort and cost.

To prevent lubricant from escaping to the outside from the second chamber, this second chamber is advantageously sealed off from the outside via at least one felt seal.

The embodiment according to the invention can be employed in numerous devices that appear useful to one skilled in the art, in particular in power tools in which space-saving, lightweight, economical sealing devices with a long service life, especially for components rotating at high speed, can be achieved.

BRIEF DESCRIPTION OF THE DRAWINGS

Further advantages will become apparent from the ensuing description of the drawings. In the drawings, one exemplary embodiment of the invention is shown. The drawing, description and claims include numerous characteristics in combination. One skilled in the art will expediently consider the characteristics individually as well and put them together to make useful further combinations.

Shown are.

DESCRIPTION OF THE PREFERRED EMBODIMENTS

Figure 1:
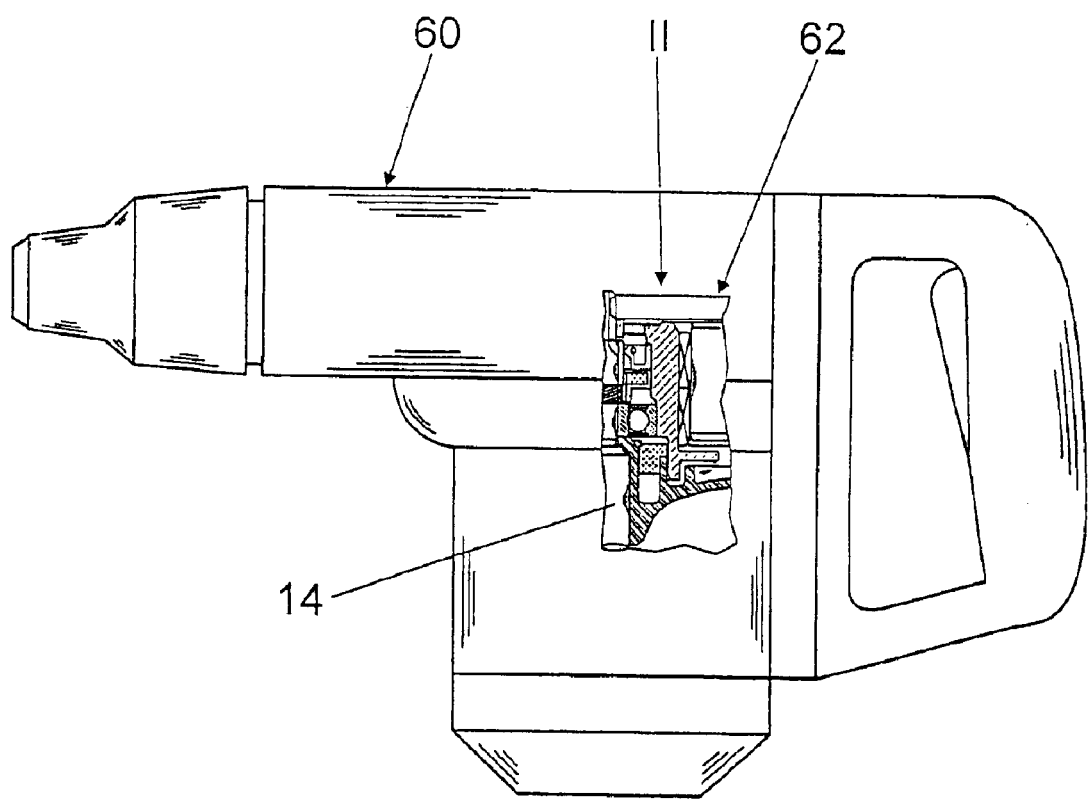
FIG. 1, a schematic illustration of a drill hammer.

FIG. 1 shows a drill hammer schematically, having an electric motor, not identified by reference numeral, in a housing 60. The electric motor, with an armature shaft 14, drives a drilling spindle and a percussion mechanism via a gear 62.

Figure 2:
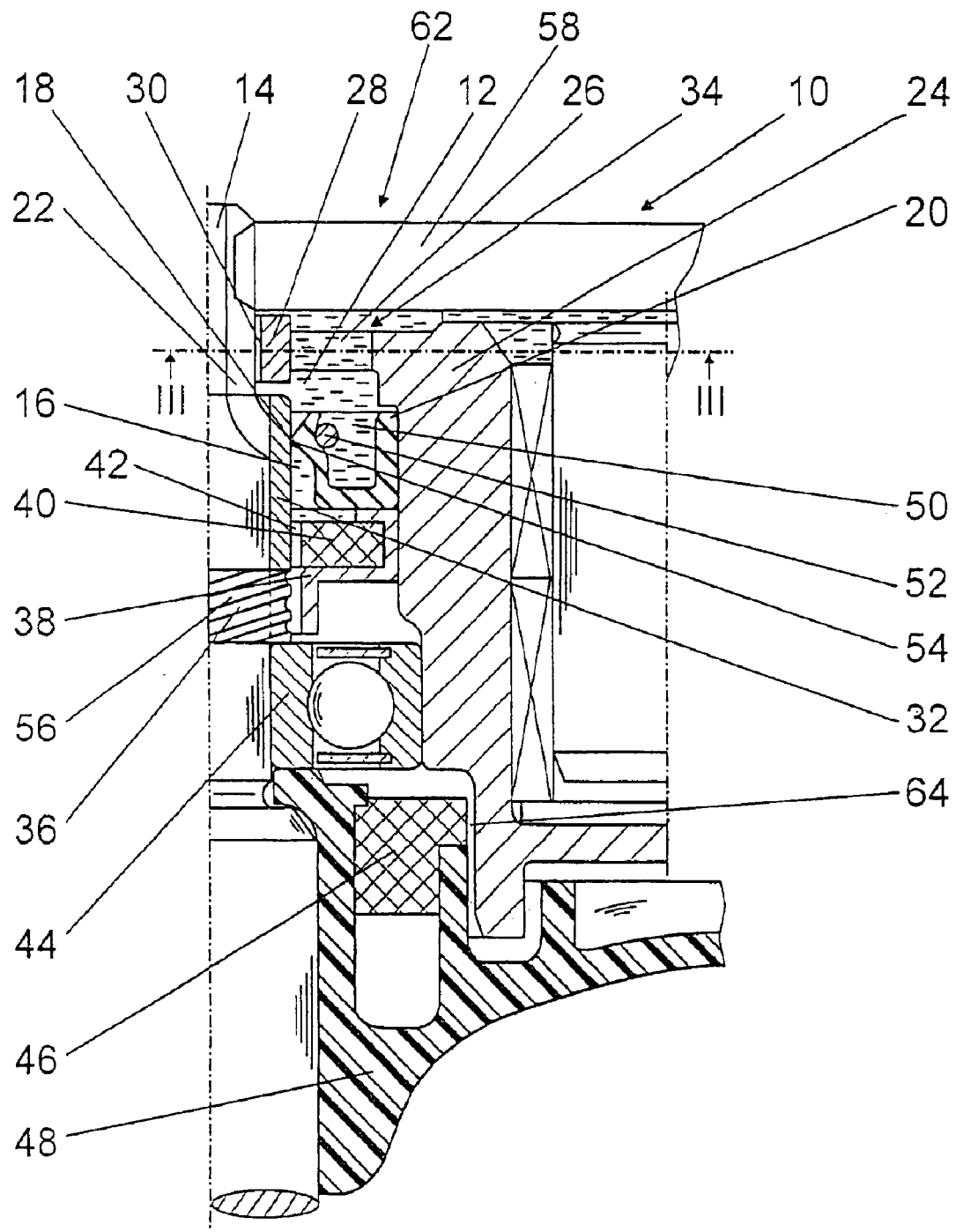
FIG. 2, an enlarged detail II of FIG. 1.

FIG. 2 shows a device for sealing off a gear chamber 10 of the drill hammer with lubricant 12 at the armature shaft 14 in the direction from the electric motor to a second chamber 16, with a seal 20 sliding along a contact face 18. Via a clamping ring 52, a sealing lip 52 of the seal 20 is urged radially inward against a race 32 pressed onto the armature shaft 14.

Figure 3:
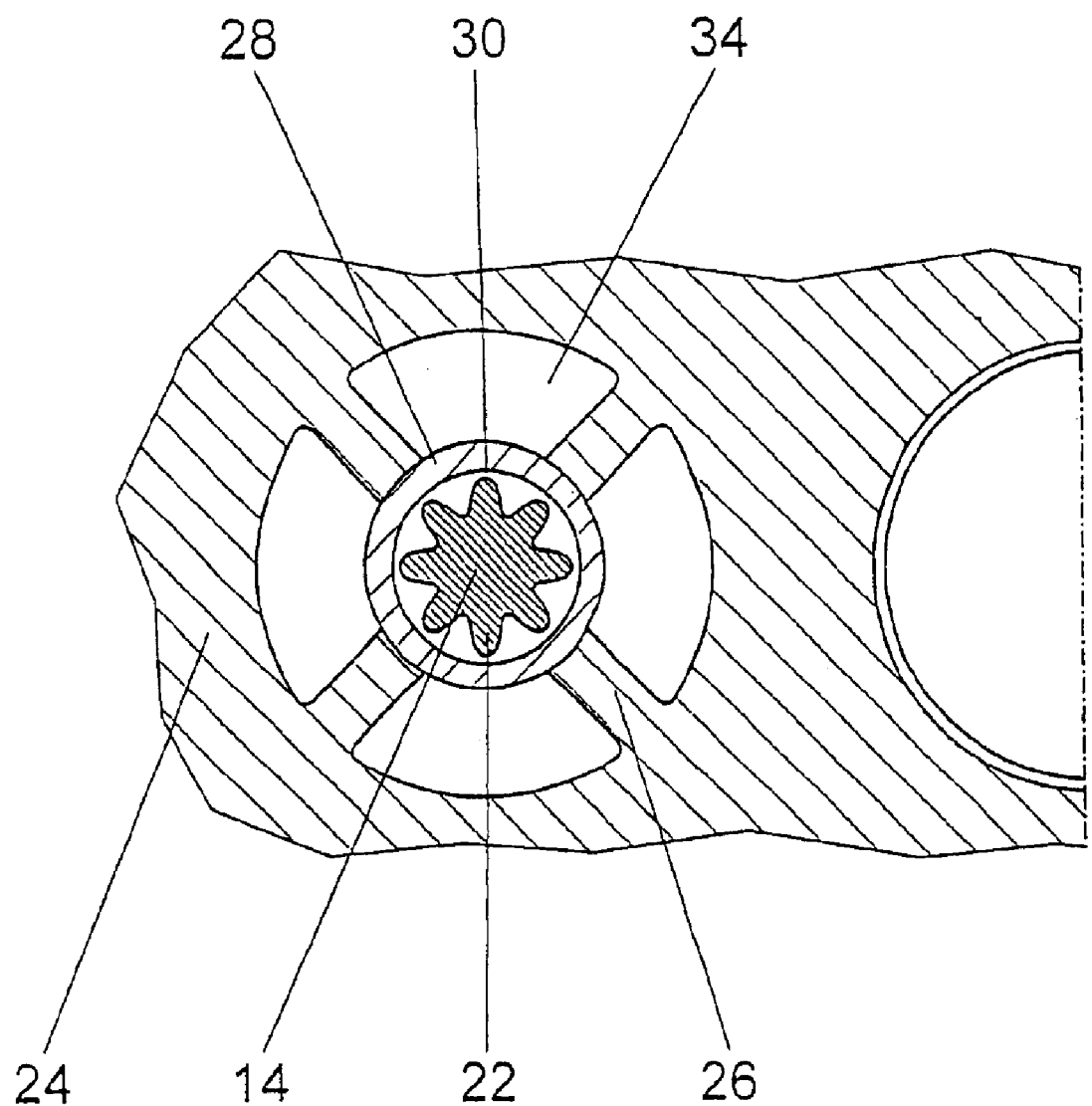
FIG. 3, a section taken along the line III—III in FIG. 2.

According to the invention, in the lubricant 12-filled gear chamber 10 before the contact face 18, a stationary sleeve 28 is disposed, which surrounds the armature shaft 14 over its circumference in the region of a set of teeth 22 and prevents turbulence in the lubricant 12 in the region of the contact face 18. Before the contact face 18, four ribs 26 are formed onto a housing part 24 of lightweight cast metal in the percussion mechanism, and the sleeve 28 is integrally formed onto these ribs (FIG. 3). In the axial direction, the sleeve 26 has a length of greater than 2 mm, and on a first side, it is advantageously at an axial spacing of less than 2 mm from a spur pinion 58 of the gear 62, which meshes with the teeth 22, while on a second side, it is at an axial spacing of less than 2 mm from the race 32. From the tooth tips of the teeth 22, the sleeve 26 has a radial spacing 30 of less than 1 mm (FIG. 3).

Between each two ribs 26, there are recesses 34, which connect a chamber 50, which is defined by the armature shaft 14, the seal 20, the housing part 24, the ribs 26 and the sleeve 28, to the gear chamber 10 and enable an exchange of lubricant (FIGS. 2 and 3).

In the second chamber 16, a sleeve 56 is pressed onto the armature shaft 14 before the seal 20, and a feed screw 36 is placed in this sleeve and is surrounded over its circumference by a sleeve 38 secured in such a way that it is stationary on the housing part 24. The sleeve 56 is shown in the uncut state. A felt ring 40 is disposed axially between the contact face 18 and the feed screw 36. The felt ring 40 is retained in the sleeve 38 that surrounds the feed screw 36, and toward the armature shaft 14 it has a gap 42, by way of which the lubricant 12 can be fed to the seal 20 by the feed screw 36.

The second chamber 16 is also sealed off, in the direction of the electric motor, after a bearing 44 of the armature shaft 14, via a felt seal 46, which is secured by positive engagement in a fan wheel 48 pressed onto the armature shaft 14 and which encloses a gap seal 64 relative to the housing part 24.

By means of the ribs 26 and the sleeve 28, at a high rotary speed of the armature shaft 14, turbulence in the lubricant 12 in the region of the seal 20, and in particular in the region of the contact face 18 is avoided, as is drying out of the seal 20. At the same time, a slight quantity of lubricant 12 that has emerged from the chamber 10 and is located in the second chamber 16 is returned in the direction of the seal 20 by a feeder device, formed of the feed screw 36 and the sleeve 38, by way of the gap 42 between the felt ring 40 and the race 32. The sealing lip 54 of the seal 20 is advantageously lubricated on both sides during operation. In the felt ring 40, lubricant 12 is stored.

List of Reference Numerals

10 Chamber
12 Lubricant
14 Component
16 Second chamber
18 Contact face
20 Seal
22 Set of teeth
24 Housing part
26 Rib
28 Stationary component
30 Spacing
32 Race
34 Recess
36 Feed screw
38 Component
40 Felt ring
42 Gap
44 Bearing
46 Felt seal
48 Fan wheel
50 Chamber
52 Clamping ring
54 Sealing lip
56 Sleeve
58 Spur pinion
60 Housing
62 Gear
64 Gap seal

What is claimed is:

1. A multi-chamber device, comprising a rotationally drivable component; means forming a first chamber with a lubricant on said rotationally drivable component; means forming a second chamber; means for sealing said first chamber from said second chamber and including at least one seal sliding at a contact face; at least one stationary component provided in said first chamber with lubricant and surrounding said rotationally drivable component at least over one region of a circumference so as to at least substantially prevent turbulence in the lubricant in a region of the contact face; said stationary component partitioning said first chamber into a gear chamber and a third chamber; said third chamber being delimited by said sliding seal; said stationary component having at least one recess connecting said third chamber and said gear chamber whereby said recess allows for an two-way exchange of lubricant between said third chamber and said gear chamber.

2. A multi-chamber device as defined in claim 1; and further comprising at least one rib disposed of a housing part before said contact face; said rib being directed radially with its lengthwise direction.

3. A multi-chamber device as defined in claim 2, wherein said stationary component comprises a sleeve surrounding said rotationally drivable component before said contact face.

4. A multi-chamber device as defined in claim 3, wherein said sleeve is secured to said rib.

5. A multi-chamber device as defined in claim 3, wherein said sleeve has a length of at least 2 mm in an axial direction.

6. A multi-chamber device as defined in claim 2; and further comprising a second rib; and at least one recess formed between said ribs.

7. A multi-chamber device as defined in claim 2; and further comprising a set of teeth which is surrounded by said stationary component.

8. A multi-chamber device as defined in claim 1, wherein said stationary component has a radial spacing of less than 1 mm from said rotationally drivable component.

9. A multi-chamber device, comprising a rotationally drivable component; means forming a first chamber with a lubricant on said rotationally drivable component; means forming a second chamber; means for sealing said first chamber from said second chamber and including at least one seal sliding at a contact face; at least one stationary component provided in said first chamber with lubricant and surrounding said rotationally drivable component at least over one region of a circumference so as to at least substantially prevent turbulence in the lubricant in a region of the contact face, said sliding seal communicating freely with said first chamber with lubricant via at least one recess; and a feed screw operatively connected to said rotationally drivable component and provided in said second chamber before said seal; and a second stationary component which surrounds said first mentioned rotationally drivable component at least substantially over one region of a circumference.

10. A multi-chamber device, comprising a rotationally drivable component; means forming a first chamber with a lubricant on said rotationally drivable component; means forming a second chamber; means for sealing said first chamber from said second chamber and including at least one seal sliding at a contact face; at least one stationary component provided in said first chamber with lubricant and surrounding said rotationally drivable component at least over one region of a circumference so as to at least substantially prevent turbulence in the lubricant in a region of the contact face, and further comprising a feed screw operatively connected to said rotationally drivable component and provided in said second chamber before said seal; and a second stationary component which surrounds said first mentioned rotationally drivable component at least substantially over one region of a circumference.

11. A multi-chamber device as defined in claim 10; and further comprising a felt ring located axially between said contact face and said feed screw.

12. The multi-chamber device according to claim 10, wherein said sliding seal communicates freely with said first chamber with lubricant via at least one recess.

13. A multi-chamber device, comprising a rotationally drivable component; means forming a first chamber with a lubricant on said rotationally drivable component; means forming a second chamber; means for sealing said first chamber from said second chamber and including at least one seal sliding at a contact face; at least one stationary component provided in said first chamber with lubricant, and surrounding said rotationally drivable component at least over one region of a circumference so as to at least substantially prevent turbulence in the lubricant in a region of the contact face; said stationary component comprising at least one rib disposed on a housing part before said contact face; said rib being directed radially.

* * * * *